United States Patent [19]

Kawashima et al.

[11] Patent Number: 5,246,535
[45] Date of Patent: Sep. 21, 1993

[54] METHOD AND APPARATUS FOR CONTROLLING THE DIAMETER OF A SILICON SINGLE CRYSTAL

[75] Inventors: Akihiro Kawashima; Tatsuo Sato; Toshio Okawa, all of Tokyo, Japan

[73] Assignee: NKK Corporation, Tokyo, Japan

[21] Appl. No.: 936,071

[22] Filed: Aug. 26, 1992

Related U.S. Application Data

[63] Continuation of Ser. No. 691,699, Apr. 26, 1991, abandoned.

[30] Foreign Application Priority Data

Apr. 27, 1990 [JP] Japan .................................. 2-110385

[51] Int. Cl.$^5$ ............................................. C30B 15/26
[52] U.S. Cl. ........................................ 156/601; 156/600; 156/617.1; 156/618.1
[58] Field of Search ....................... 156/600, 601, 617.1, 156/618.1

[56] References Cited

U.S. PATENT DOCUMENTS

| | | | |
|---|---|---|---|
| 3,617,392 | 11/1971 | Locke | 23/273 |
| 3,761,692 | 9/1973 | Cope | 156/601 |
| 4,242,589 | 12/1980 | Sachs | 156/601 |
| 4,539,067 | 9/1985 | Washizuka et al. | 156/601 |
| 4,565,598 | 1/1986 | Seymour | 156/601 |
| 4,591,994 | 5/1986 | Washizuka et al. | 156/601 |
| 4,794,263 | 12/1988 | Katsuoka et al. | 156/601 |

FOREIGN PATENT DOCUMENTS

142415 5/1985 European Pat. Off. .
294311 12/1988 European Pat. Off. .

OTHER PUBLICATIONS

Hull, E. M. et al. "Monitoring Diameter of Semiconductor Crystals During Automated Growth", *IBM Technical Disclosure Bulletin* vol. 19, No. 3, Aug. 1976, pp. 869–870.

Moody, J. W. et al. "Developments in Czochralski Silicon Crystal Growth", *Solid State Technology*, vol. 26 (1983) Aug., No. 8, pp. 221–224.

*Primary Examiner*—Robert Kunemund
*Assistant Examiner*—Felisa Garrett
*Attorney, Agent, or Firm*—Michael N. Meller

[57] ABSTRACT

A method of controlling the diameter of a silicon single crystal. In the course of manufacturing a silicon single crystal by pulling the silicon single crystal while rotating it relative to a crucible, a comparison between a measured diameter value of the pulled single crystal measured by optical means and a desired diameter value is made to determine a deviation so that the resulting deviation is subjected to an incomplete differential PID processing or the Smith method processing to calculate a pull rate and the pull rate is applied to a motor controller of a crystal pulling apparatus thereby performing the diameter control of the pulled single crystal through the manipulation of the pull rate. An apparatus for controlling the diameter of a silicon single crystal includes input means for receiving a measured diameter value of a pulled single crystal measured by optical means, incomplete differential PID computing means for making a comparison between a measured diameter value of the pulled single crystal and a desired diameter value a plurality of times at intervals of a unit rotational period to calculate a pull rate, and output means for applying the pull rate to a motor controller of a crystal pulling apparatus.

8 Claims, 6 Drawing Sheets

METHOD AND APPARATUS FOR CONTROLLING THE DIAMETER OF A SILICON SINGLE CRYSTAL

This application is a continuation of application Ser. No. 691,699, filed Apr. 26, 1991 now abandoned.

BACKGROUND OF THE INVENTION

The present invention relates to a method and apparatus for controlling the diameter of a silicon single crystal and more particularly to a silicon single crystal diameter controlling method and apparatus whereby in the continuous manufacture of a silicon single crystal while rotating it relative to a crucible, the diameter of the pulled single crystal is controlled during the pulling of the crystal.

Figure 2:
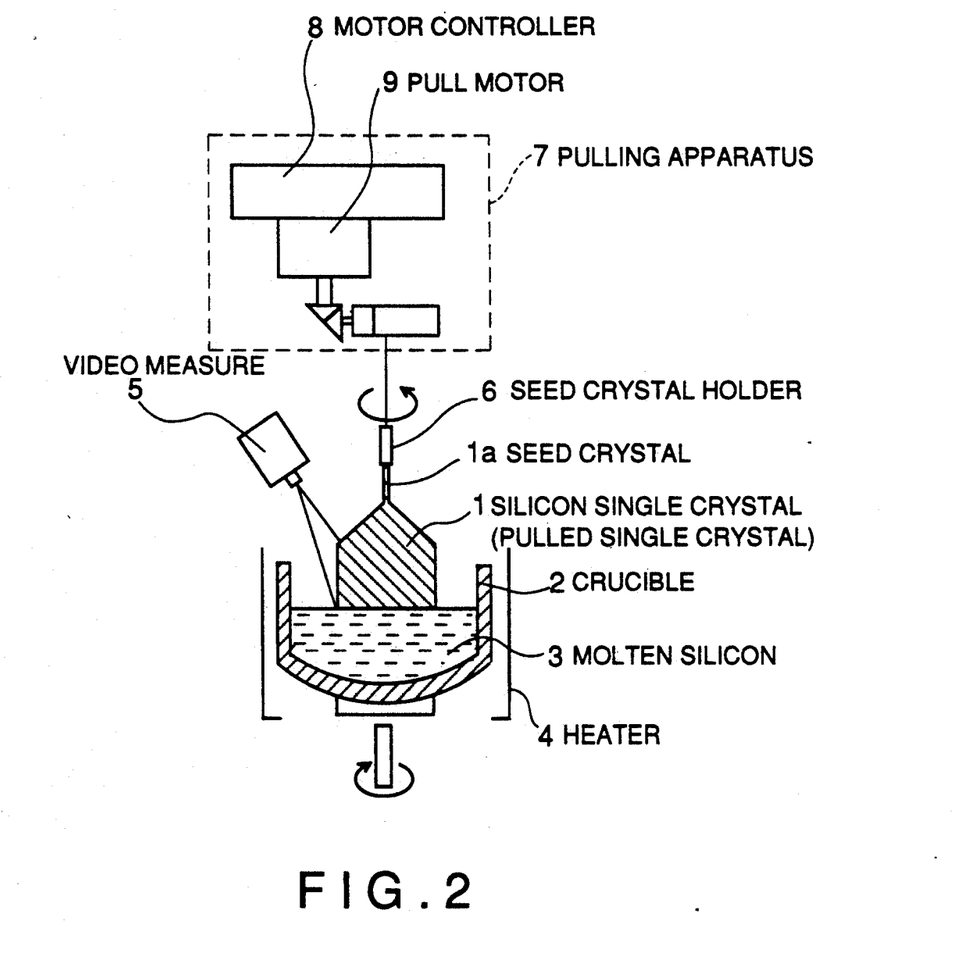
FIG. 2 is a schematic diagram showing the construction of a conventional silicon single crystal manufacturing apparatus in accordance with the Czochralski method.

Referring to FIG. 2 of the accompanying drawings, there is illustrated a schematic diagram showing a single crystal manufacturing apparatus according to the Czochralski method which is well known as a manufacturing method of single crystals of such semiconductor as silicon. It is to be noted that the Czochralski method is widely called as the CZ method and also it is generally referred to as a crystal pulling method.

In the Figure, during the manufacture of a silicon single crystal, contained in a crucible 2 is molten silicon 3 which is heated and melted by a heater 4 so that while rotating a silicon single crystal 1 in a direction opposite to the direction of rotation of the crucible 2 by a turning mechanism which is not shown, the silicon single crystal 1 is gradually pulled by a pulling apparatus 7 and the crystal is grown in the interfacial region between the molten silicon 3 and the silicon single crystal 1. This silicon single crystal 1 is grown from a seed crystal 1a by crystal growth and the seed crystal 1a is supported by a seed crystal holder 9 connected to the pulling apparatus 7. In the description to follow, this silicon single crystal under growth is referred to as a pulled single crystal. Also, the pulling apparatus 7 includes mechanisms for respectively moving vertically and rotating the silicon single crystal 1 and it is composed of a motor controller 8, a pull motor 9, etc. Thus, it is a well known apparatus and any detailed explanation of its construction will be omitted. The crucible 2 is supported by a lifting mechanism which is not shown in addition to the previously mentioned turning mechanism and it is designed so that even if a crystal is grown, for example, the liquid level is prevented from lowering but maintained constant by the lifting mechanism and the temperature distribution in the vicinity of the liquid surface is not varied.

Since the pulled single crystal 1 manufactured by the CZ method is processed into a cylindrical silicon single crystal ingot later on, it is required that the pulled single crystal 1 is pulled in such a manner that its diameter is substantially the same throughout the body portion on the whole. For this purpose, a diameter control is effected such that the diameter of the pulled single crystal 1 is directly measured during its pulling by such optical means as a video measure 5 and the pulled single crystal 1 is pulled while adjusting the pull rate in a manner that the diameter is maintained at the desired value. In this case, the optical means is attached to the crystal pulling apparatus so that the fusion ring appealing at the boundary of the pulled single crystal 1 and the liquid surface is measured obliquely from above with a single measuring line and the diameter of the pulled single crystal 1 is measuring directly.

The above-mentioned diameter control of a pulled single crystal through the adjustment of the pull rate is performed by comparing the actual measured diameter value from the optical means and the desired diameter value so that the resulting deviation is subjected to the well known PID control to calculate a pull rate as a manipulated variable and this manipulated variable is applied as a command to the motor controller 8, thereby controlling the pull rate.

With the above-mentioned silicon single crystal diameter control method and apparatus described above, it is general that if, for example, the pull rate of the crystal pulling apparatus is changed, the response of the silicon single crystal or the change of the diameter of the pulled single crystal is such that a considerable time is required before its effect is exerted (the dead time is long) and also the rate of change is small (the change or response speed is low). Thus, where the measured diameter value is compared with the desired diameter value to effect the PID control, a timely manipulation of the pull rate is required in order to accurately grasp a change in the diameter of the pulled single crystal and therefore an advanced control giving emphasis to the derivative term (derivative action) is required. However, considerable noise is included in the measured diameter value of the pulled single crystal measured by the optical means and there is the danger of the pull speed being varied excessively under the effect of such noise, Thus making it impossible to effect a control emphasizing the derivative term. Thus, there is a limit to the control of the crystal diameter variation and the yield of the crystal tends to deteriorate.

In addition, the adjustment of the PID parameters on the spot is essential and thus it is necessary to wastefully pull the silicon single crystal for the purpose of PID parameter adjustment alone.

SUMMARY OF THE INVENTION

The present invention has been made with a view to overcoming the foregoing problems in the prior art, and it is the primary object of the present invention to provide a silicon single crystal diameter control method and apparatus so designed that the algorithm of the PID processing performed in a diameter control is improved and also a dead time compensation control is added, thereby ensuring an improved desired value follow-up and eliminating any PID parameter adjusting operation of the spot.

To accomplish the above object, in accordance with one aspect of the present invention there is thus provided a silicon single crystal diameter control method so designed that in the course of manufacturing a silicon single crystal by pulling the silicon single crystal while rotating it relative to a crucible, a comparison between the measured diameter value of a pulled single crystal measured by optical means and the desired diameter value is made to determine a deviation so that the resulting deviation is subjected to incomplete differential PID processing to calculate a pull rate and the pull rate is applied to the motor controller of a crystal pulling apparatus, thereby controlling the diameter of the pulled single crystal through the manipulation of the pull rate.

In accordance with another aspect of the present invention there is provided such silicon single crystal diameter control method in which the incomplete differential PID processing is replaced with the processing by the Smith method to calculate a pull rate.

In accordance with still another aspect of the present invention, there is provided a silicon single crystal diameter control apparatus including an input unit for receiving the measured diameter value of a pulled single crystal measured by optical means, an incomplete differential PID computing unit for making a comparison between the measured diameter value of the pulled single crystal and the desired diameter value to calculate a pull rate, and an output unit for applying the pull rate to the motor controller of a crystal pulling apparatus.

In accordance with still another aspect of the present invention there is provided such silicon single crystal diameter controlling apparatus in which the incomplete differential PID computing unit is replaced with a Smith method computing unit.

In accordance with still another aspect of the present invention there is provided a silicon single crystal model parameterization method in which the response characteristic of the diameter value of a pulled single crystal to the pull rate is modeled by the transfer function given by the following equation and the two model parameters in the transfer function or the response speed V and the dead time L are determined by a step response test for studying the response of the diameter value when the pull rate is varied in a stepwise manner:

$$\text{Transfer function: } Gp(s) = \frac{V}{S^2} \cdot e^{-Ls}$$

In accordance with still another aspect of the present invention there is provided a PID parameterization method which determines the optimum parameters by performing a computer simulation by using the previously mentioned silicon single crystal model.

In accordance with the first silicon single crystal diameter control method and apparatus there is exhibited an effective differential effect in which the effect of noise in the measured diameter values is reduced by the incomplete differential PID control, thereby causing the diameter value of the silicon single crystal to become extremely close to the desired value.

Also, in accordance with the second silicon single crystal diameter control method and apparatus, the incomplete differential PID control is not used alone and the diameter control according to the Smith method is performed so that in addition to the actions of the first diameter control method and apparatus, a dead time compensation model in the form of $V/S^2 \cdot (1-e^{-Ls})$ is inserted in a minor loop so that a transfer function $V/S^2$ involving no dead time is made a control system and the diameter control excellent in desired value follow-up performance is effected.

It is to be noted that the PID parameters which are applied to the computing means of the above-mentioned diameter control method and apparatus, are not determined by actually pulling silicon single crystals and the optimum parameters are determined by computer simulations.

DESCRIPTION OF THE PREFERRED EMBODIMENTS

Preferred embodiment of the present invention will now be described. The description of Embodiment 1 mainly explains a silicon single crystal diameter cpontrol method and apparatus by incomplete processing and the description of Embodiment 2 explains a diameter control method and apparatus by the Smith method processing.

Embodiment 1

Figure 1:
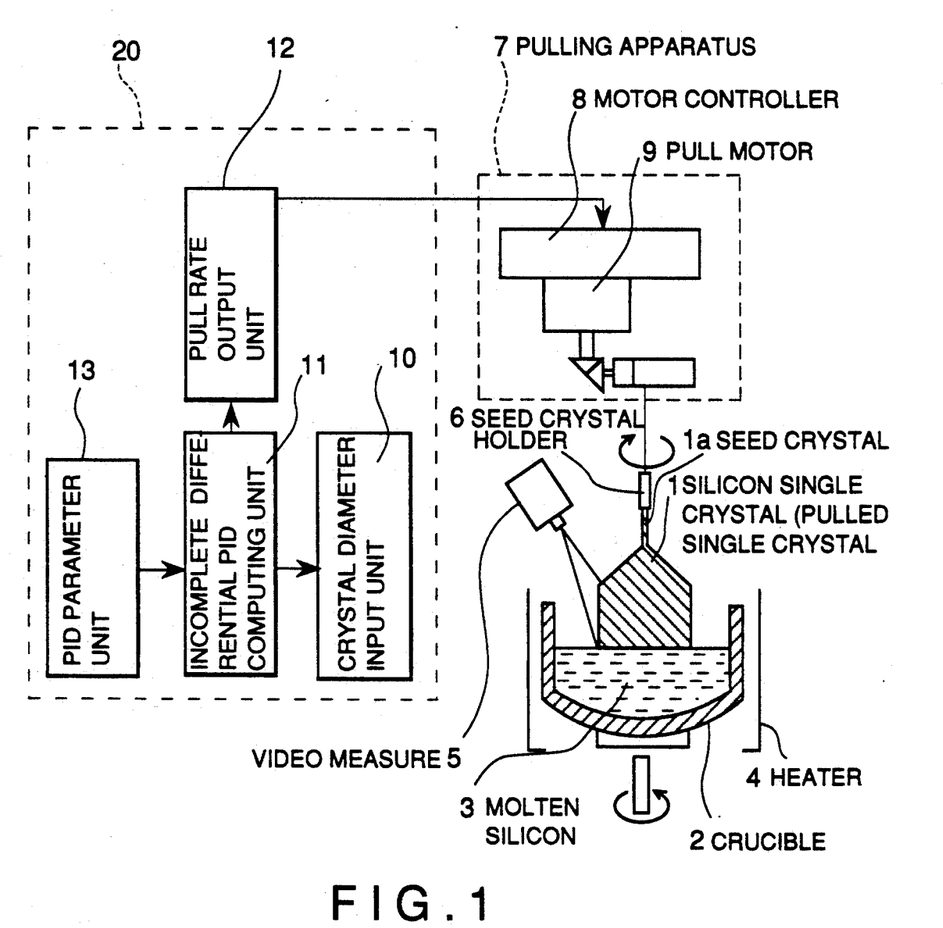
FIG. 1 is a schematic diagram showing the construction of an embodiment of a diameter control apparatus which is used for performing a silicon single crystal diameter control method by incomplete differential PID processing according to the present invention.
Figure 3:
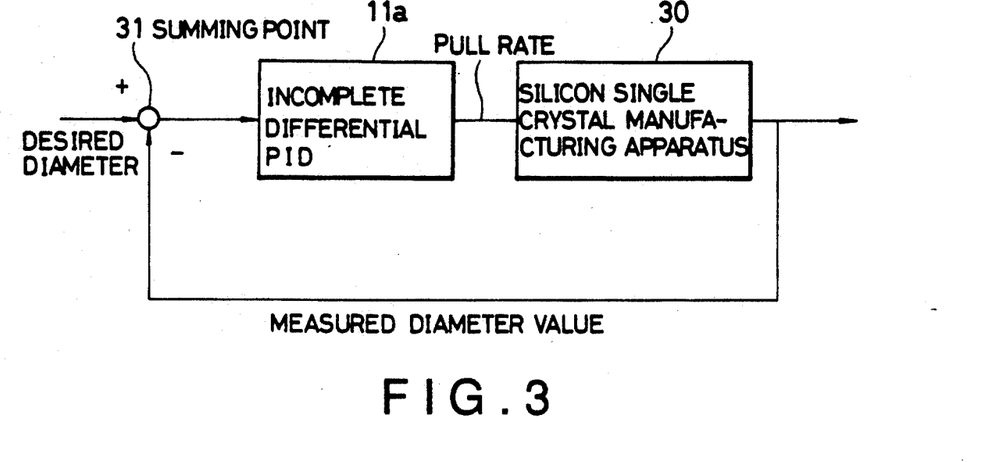
FIG. 3 is a block diagram for explaining the function of the embodiment apparatus of FIG. 1.

FIG. 1 is a schematic diagram showing the construction of the embodiment of the diameter control apparatus used for performing the diameter control method by incomplete differential PID processing. In the Figure, numerals 1 to 9 designate component parts which are identical equivalent to those designed by the same reference numerals used in the description of the conventional silicon single crystal manufacturing apparatus of FIG. 2 and will not be described. FIG. 3 is a block diagram for explaining the function of the diameter control apparatus of FIG. 1.

In FIG. 1, numeral 20 designates the portion shown in block diagram form the diameter control apparatus by incomplete differential PID processing. In this apparatus, the controlled system data basically represents the measured diameter values measured by a video measure 5 used as optical means. As shown in the Figure, the diameter control apparatus is composed of a crystal diameter input unit 10 for processing the measured diameter values, an incomplete differential PID computing unit 11 for comparing the processed measured diameter values and the desired diameter to calculate a pull rate, and a pull rate output unit 12 for applying the pull rate as a command to the silicon single crystal manufacturing apparatus (crystal pulling apparatus). Numeral 13 designates PID parameter unit for storing the parameters used during the processing.

The embodiment of the diameter control method by incomplete differential PID will now described with reference to FIG. 1 and 2. The measured diameter values produced from the video measure 5 (these are the output of the silicon single crystal manufacturing apparatus 30 in FIG. 3 and the output of the crystal diameter input unit 10 in FIG. 1) are compared with the desired diameter stored in a memory (not shown) at a summing point 31 and a PID processing 11a utilizing an incomplete differential is performed in the incomplete differential PID computing unit 11, thereby calculating a manipulated output or a pull rate. This pull rate is applied to the motor controller 8 through the pull rate output unit 12 to command it and the pulled single crystal 1 is pulled at the controlled pull rate, thereby manufacturing the silicon crystal 1. This control operation is performed for example several times for every rotation of the pulled singloe crystal 1 and thus this operation is performed throughout the pulling of the body portion.

By performing the foregoing diameter control method, it is possible to manufacture a silicon single crystal 1 which is reduced in diameter variation and which is close in diameter value to the desired diameter. It is to be noted that in this control method the PID parameter unit 13 stores the best parameters determined by the computer simulation using the silicon single crystal model and therefore no adjustment of the PID parameters on the spot is required.

The algorithm of the incomplete differential PID processing and the model parameterization method will now be described.

The manipulated output Go(s) produced by the ordinary PID action alone is given by the following equation (II) with E(s) representing the deviation between the measured diameter value and the desired diameter:

$$G_o(s) = K^*(1 + 1/(T_i^*s) + T_d^*s)E(s) \quad (II)$$

where K is a proportional gain, Ti an integral time, Td a derivative time, and s a Laplace variable (complex number).

On the other hand, the following equation (III) gives the manipulated output G(s) of the incomplete differential PID action used in the diameter control of the present invention.

$$G(s) = K^*\{1 + 1/(T_i^*2) + T_d^*s/(1 + \alpha^*T_d^*s)\}^*E(s) \quad (III)$$

Figure 4:
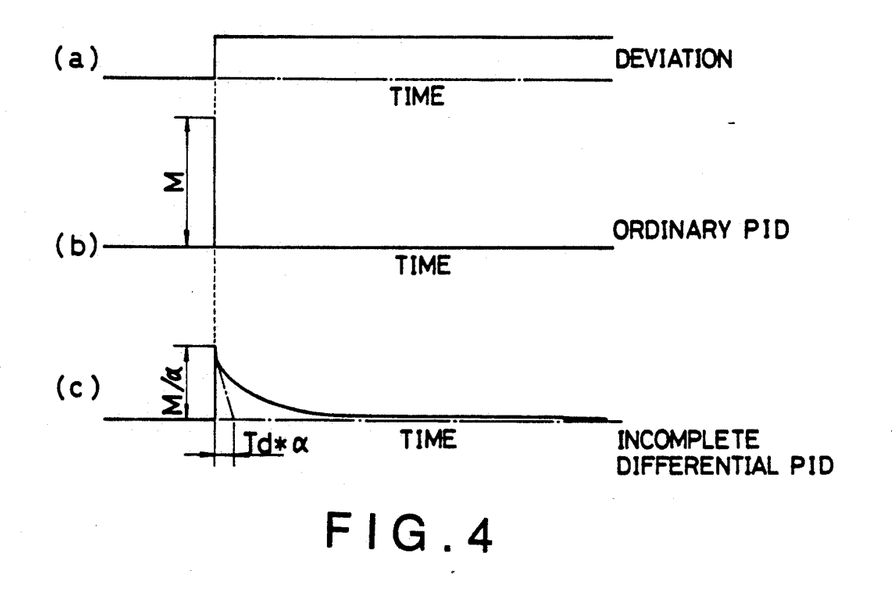
FIG. 4 is a comparative waveform diagram showing the response characteristic of the incomplete differential to the stepwise variation of the deviation.

Here, 1/α is called as a differential gain. While the difference between equations (II) and (III) resides in the calculation of the manipulated variable by the differentiation term, in the case of equation (III) the ordinary differentiation term output Td s of equation (II) is passed through the first-order delay filter. This control by the incomplete differential itself is well known, but its general effect is explained as follows: FIG. 4 shows comparative waveform diagrams of the response characteristics with respect to the stepwise variation of the deviation E(s). FIG. 4(a) shows the values of the deviation with respect to the time on the abscissa, and in FIG. 4(b) the ordinate represents the manipulated output variable M of the ordinary differential PID processing with respect to the deviation. FIG. 4(c) shows the response characteristic of the manipulated output variable M in the processing. As will be sen from FIG. 4, in the case of the incomplete differential PID, as for example, the output with respect to noise deviation is reduced by the gain of 1α(M/α in the Figure) so that the sensitive response to noise is decreased and an effective differential effect is obtained.

Also, as regards the silicon single crystal model used in the computer simulation for determining the PID parameters 13, it is approximated by the quadratic integral system which is given by the following equation (IV) giving consideration to the dead time L and which is capable of faithfully reproducing the actual response.

$$G_p(s) = \frac{V}{S^2} \cdot e^{-Ls} \quad (IV)$$

where V=response speed

The model parameters including the dead time L and the response speed are determined by the following procedure. Firstly, in the silicon single crystal manufacturing apparatus the pull rate is varied in a stepwise manner and the resulting response data of the silicon single crystal diameter are gathered. Then, the dead time L and the response speed V are assumed and the step response test is reproduced by the computer simulation. Then, the values of V and L are determined in such a manner that the error between the simulation result and the actual response waveform data is reduced to a minimum.

A description will now be made of the results of a working example in which a silicon single crystal was actually manufactured by the above-mentioned incomplete differential PID control method and apparatus.

In this working example, a series of operations including the comparison between the moving average value of measured diameter data every 0.1 sec. and a desired diameter value, the calculation of a pull rate and the application of the pull rate to the motor controller 8 were performed once every second, that is, the operations were performed 3 times for even rotation of the silicon single crystal. (The rotational speed of the pulled single crystal was 20.0 rpm). As regards controlling cycle, when pull rate and rotations increases and the same time a disturbance caused by operation, such as temperature variations etc. in crucible increases, further shortening thereof is effectuated on the diameter control of a pulled single crystal.

Figure 5:
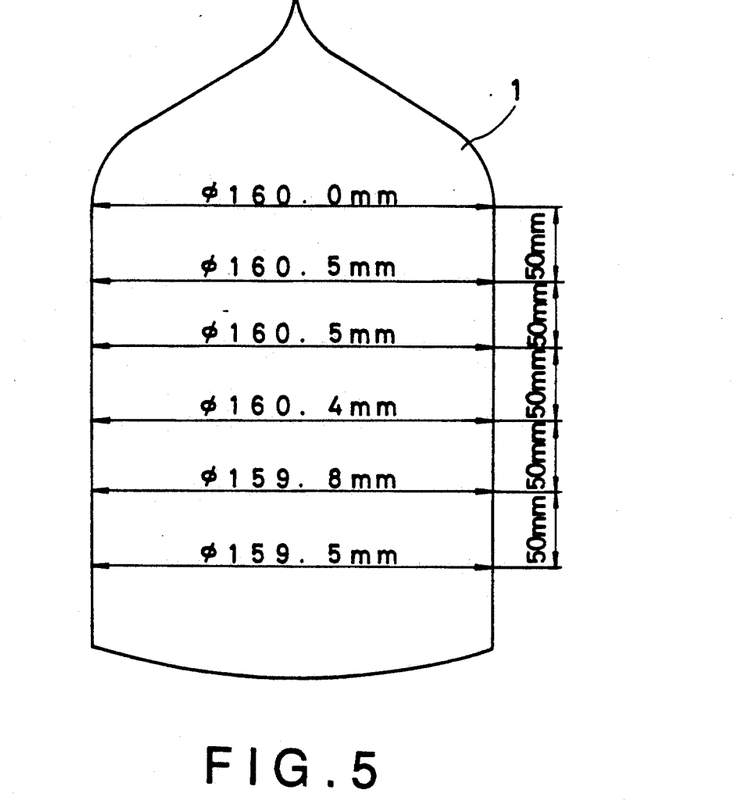
FIG. 5 is a schematic diagram showing the measured diameter values of a manufactured silicon single crystal.

The desired diameter of the body portion was 160.0 mm. The schematic diagram of FIG. 5 shows the results of the diameter measurements made at the positions of 0.0, 50.0, 100.0, 150.0, 200.0 and 250.0 mm from the top of the effective body portion of the manufactured silicon single crystal. As shown in FIG. 5, the maximum and minimum values of the deviation from the desired diameter of 160.0 mm were less than ±0.5 mm and the manufactured silicon single crystal was uniform in diameter at the various portions.

Also, this data represents the first manufacture made on the basis of the PID parameters determined by the computer simulation using the silicon single crystal model and the silicon single crystal accurately following the desired diameter in this way was manufactured at the first attempt.

Working example 2

Figure 6:
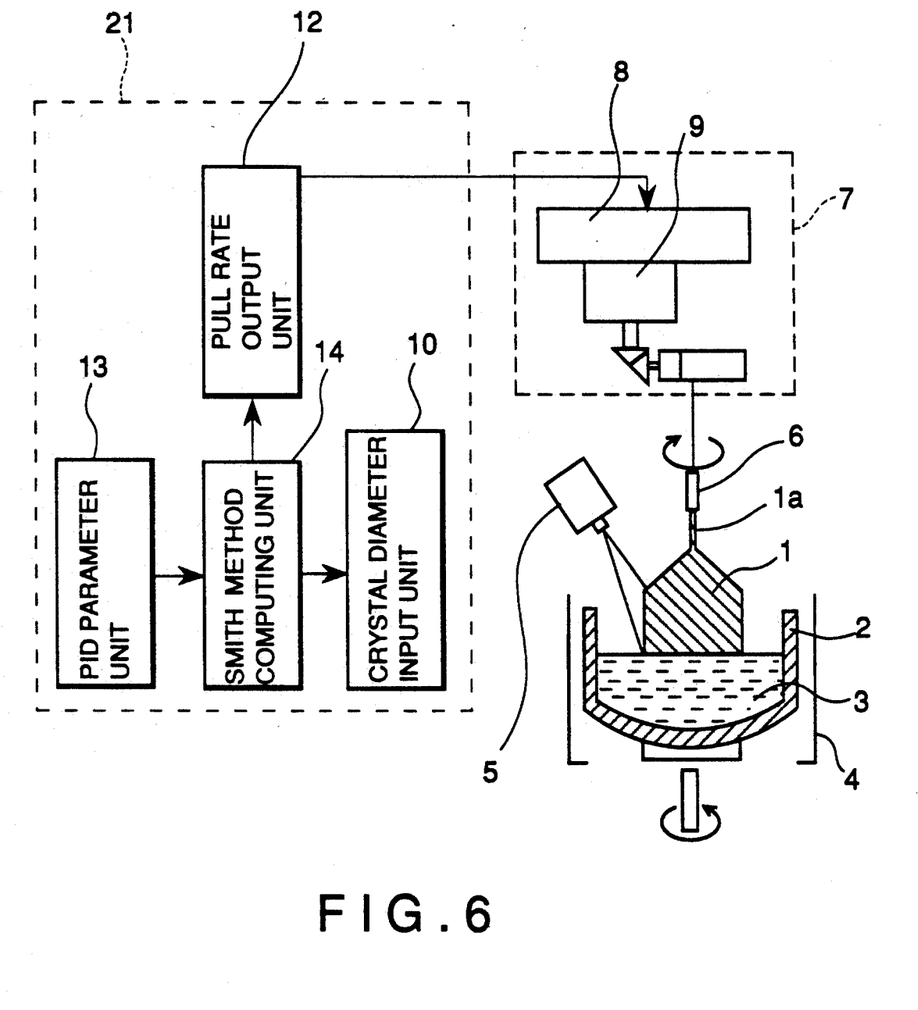
FIG. 6 is a schematic diagram showing the construction of an embodiment of a diameter control apparatus which is used for performing a diameter control method by the Smith method processing.

Referring to FIG. 6, there is illustrated a schematic diagram showing the construction of an embodiment, of a diameter control apparatus used for performing a diameter control method according to the Smith method processing.

Figure 7:
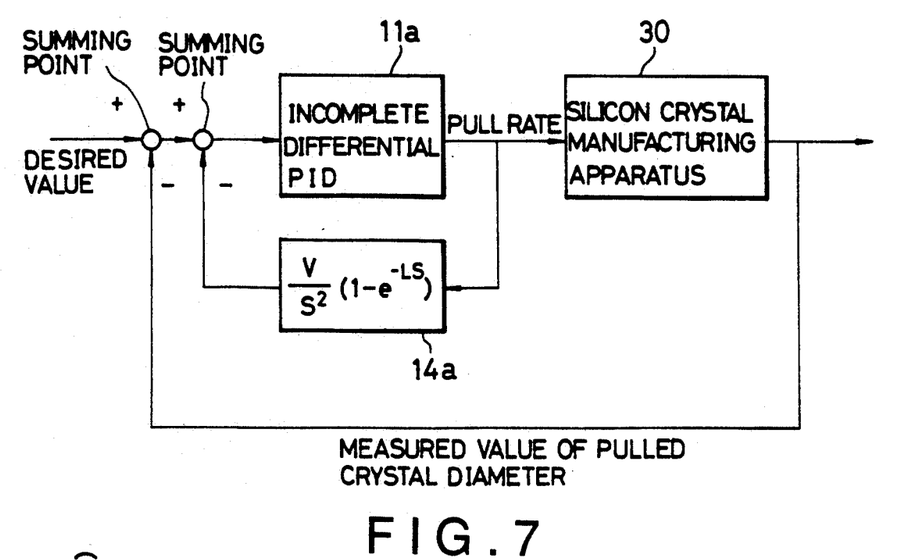
FIG. 7 is a block diagram for explaining the function of the embodiment apparatus of FIG. 6.

In the Figure, numerals 1 to 13 excluding 11 designate component parts which are identical or equivalent to those designated by the same reference numerals used in the description of the embodiment apparatus of FIG. 1. FIG. 7 is a block diagram for explaining the function of the diameter control apparatus of FIG. 6.

In FIG. 6, numeral 21 designated the portion showing in block diagram form the diameter control apparatus by the Smith method processing, and numeral 14 designates a Smith method computing unit. While this embodiment is identical in construction with the embodiment of FIG. 1 except that the incomplete differential PID computing unit 11 is replaced by the Smith method computing unit 14, as will be seen from FIG. 7, thought he principal adjusting function of the Smith method control is the operation of the incomplete differential PID 11a, the diameter control of a pulled single crystal 1 according to the Smith method has an additional feature that the silicon single crystal model given by equation (IV) is used for the determination of a control deviation. In other words, in addition to the principal loop of the feedback to the incomplete differential PID 11a, a transfer function $$\frac{V}{S^2}(1 - e^{-Ls})$$

14a according to the dead time compensation model obtained from equation (IV) is inserted in the minor loop and fed back to a summing point 2, thereby determining a control deviation. In this way, the dead time-compensated control is made possible thus accomplishing the diameter control which is excellent in desired value follow-up performance.

Figure 8:
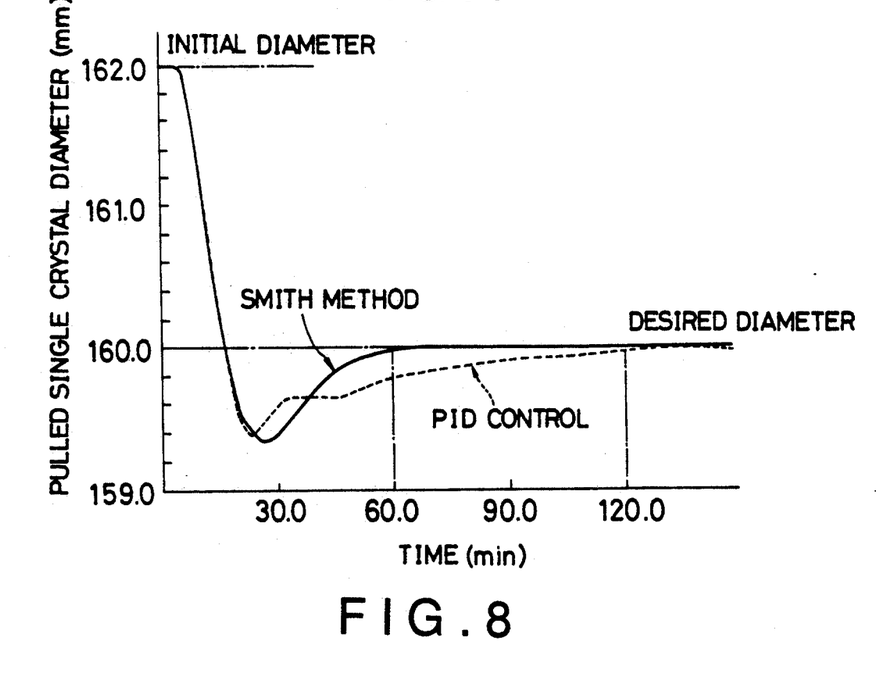
FIG. 8 is a graph showing the results of the determination by a computer simulation of the mode of the diameter control according to the Smith method.

FIG. 8 is a graph showing the result by a computer simulation of the model of the diameter control according to the Smith method control in the manufacture of a silicon single crystal. In the Figure, the abscissa represents the control time and the ordinate represents the pulled single crystal diameter. The solid line indicates the control characteristic according to the Smith method and the simulation result according to the conventional PID control is indicated by the broken line for reference purposes. In the case of the simulation, the control characteristic was determined by using the initial diameter of 162.0 mm and the desired diameter of 160.0 mm. As will be seen from the Figure, the PID control requires about 2 hours until the measured diameter becomes equal to the desired diameter, whereas the Smith method requires about 1 hour and the Smith method ensures a dead time-compensated control which is excellent in desired value follow-up.

From the foregoing it will be seen that in accordance with the silicon single crystal diameter control method and apparatus of the present invention there is an effect that not only the diameter control capable of reducing the effect of noise during the pulling of a single crystal is ensured by the incomplete differential PID control thus improving the control performance and thereby ensuring the uniformity of crystal quality, but also the control which gives emphasis to the differential term is ensured thus making the diameter extremely close to the desired value and thereby ensuring the improved yield.

Also, in accordance with the control using the Smith method, not only the effect due to the same action as the incomplete differential PID control is obtained but also the dead time-compensated control is ensured, thus accomplishing the diameter control which is excellent in desired value follow-up performance and thereby further improving the yield.

Further, since the manufacture of a silicon single crystal using the best PID parameters determined by the computer simulation is ensured form the start, it is possible to eliminated any redundant operations encountered in the manufacture of silicon single crystals by the conventional methods such as the useless pulling of a crystal, that is, the actual pulling of a silicon single crystal for the determination of parameters.

What is claimed is:

1. A silicon single crystal diameter control method for controlling a diameter of a pulled single crystal rotated relative to a crucible in accordance with a crystal pull rate, said method comprising the steps of:

making a comparison between a measured diameter value of said pulled single crystal measured by optical means and a desired diameter value to determine a deviation;

subjecting said deviation to an incomplete differential PID processing to calculate a single crystal pull rate; and applying said single crystal pull rate as a command to pull means to control the diameter of said pulled single crystal at a desired diameter.

2. A silicon single crystal diameter control method according to claim 1, wherein said deviation is processed by the Smith method in place of said incomplete differential PID processing.

3. A model parameterization method comprising the steps of:

defining a response characteristic of a diameter value of a pulled single crystal to a crystal pull rate in accordance with a transfer function given by the following equation (I); and performing a step response test for determining a response of said measured diameter value to a stepwise variation of said crystal pull rate to determine two model parameters of V and L in said transfer function:

$$Gp(s) = \frac{V}{S^2} \cdot e^{-Ls} \qquad (1)$$

where
V = response speed
L = dead time
S = Laplace variable

4. A PID parameterization method according to claim 3, wherein PID parameters used in the calculations of said incomplete differential PID processing as defined in claim 1 are determined by a computer simulation.

5. A PID parameterization method according to claim 1, wherein PID parameters used in the calculations of said incomplete differential PID processing as defined in claim 1 are determined by a computer simulation.

6. A PID parameterization method according to claim 5, wherein PID parameters used in the calculations of the Smith method parameters used in the calculations of said Smith method processing as defined in claim 2 are determined by a computer simulation.

7. A PID parameterization method according to claim 1, wherein PID parameters used in the calculations of the Smith method parameters used in the calculations of said Smith method processing as defined in claim 2 are determined by a computer simulation.

8. A silicon single crystal diameter control method according to claim 1 wherein the Smith method is superimposed on said incomplete differential PID processing.

* * * * *